(12) United States Patent
Iyobe et al.

(10) Patent No.: US 12,337,264 B2
(45) Date of Patent: Jun. 24, 2025

(54) DEFOAMING APPARATUS

(71) Applicant: IHI Corporation, Koto-ku (JP)

(72) Inventors: Toru Iyobe, Tokyo (JP); Shigenobu Watanabe, Tokyo (JP)

(73) Assignee: IHI Corporation, Koto-ku (JP)

( * ) Notice: Subject to any disclaimer, the term of this patent is extended or adjusted under 35 U.S.C. 154(b) by 381 days.

(21) Appl. No.: 17/794,777

(22) PCT Filed: Jan. 27, 2021

(86) PCT No.: PCT/JP2021/002723
§ 371 (c)(1),
(2) Date: Jul. 22, 2022

(87) PCT Pub. No.: WO2021/153575
PCT Pub. Date: Aug. 5, 2021

(65) Prior Publication Data
US 2023/0077711 A1    Mar. 16, 2023

(30) Foreign Application Priority Data
Jan. 27, 2020 (JP) ................................ 2020-010704

(51) Int. Cl.
*B01D 19/02* (2006.01)
(52) U.S. Cl.
CPC .................... *B01D 19/02* (2013.01)
(58) Field of Classification Search
CPC .................. B01D 19/00; B01D 19/02
See application file for complete search history.

(56) References Cited

U.S. PATENT DOCUMENTS

| | | | |
|---|---|---|---|
| 2,357,892 A | 9/1944 | Grant | |
| 4,362,539 A | * 12/1982 | Nelson | ............... B01D 19/02 210/242.1 |
| 5,505,862 A | * 4/1996 | Sonnenrein | ............... C02F 1/02 210/624 |

FOREIGN PATENT DOCUMENTS

| | | |
|---|---|---|
| CN | 207294770 U | 5/2018 |
| DE | 455871 C | 2/1928 |
| DE | 748712 C | 11/1944 |
| EP | 3 476 214 A1 | 5/2019 |
| JP | 38-20212 B | 10/1963 |
| JP | 53-60364 U | 5/1978 |
| JP | 53-110995 U | 9/1978 |
| JP | 58-189006 A | 11/1983 |
| JP | 9-29636 A | 2/1997 |
| JP | 10-15775 A | 1/1998 |
| JP | 2001-70892 A | 3/2001 |
| JP | 2004-208580 A | 7/2004 |
| JP | 4002439 B2 | 10/2007 |
| JP | 2014-64986 A | 4/2014 |

(Continued)

OTHER PUBLICATIONS

English Translation (Year: 2006).*
International Search Report mailed on Apr. 6, 2021, in PCT/JP2021/002723 filed Jan. 27, 2021, 6 pages.

*Primary Examiner* — Sharon Pregler
(74) *Attorney, Agent, or Firm* — Oblon, McClelland, Maier & Neustadt, L.L.P.

(57) ABSTRACT

A defoaming apparatus is described that includes a base unit, a motor supported by the base unit, and a brush connected to the motor and extending below the base unit with a tip directing downward.

4 Claims, 3 Drawing Sheets

(56) References Cited

FOREIGN PATENT DOCUMENTS

| | | | |
|---|---|---|---|
| KR | 100604338 B1 * | 7/2006 | |
| KR | 10-2011-0004606 A | 1/2011 | |

* cited by examiner

DEFOAMING APPARATUS

TECHNICAL FIELD

The present disclosure relates to a defoaming apparatus.

Priority is claimed on Japanese Patent Application No. 2020-010704, filed Jan. 27, 2020, the content of which is incorporated herein by reference.

BACKGROUND ART

For example, in metal processing and the like, processing is performed while continuously supplying a machining liquid that functions as a lubricant or a coolant to a processing position. Sludge is separated from such a machining liquid using, for example, a filtration apparatus and then the machining liquid is supplied to the processing position again. That is to say, the machining liquid is circulated through the filtration apparatus, for example, as disclosed in Patent Document 1. A machining liquid circulation system that circulates such a machining liquid includes a supply pump that pumps the machining liquid, a machining liquid tank that stores the machining liquid, and the like, in addition to a filter.

CITATION LIST

Patent Document

[Patent Document 1]
Japanese Unexamined Patent Application, First Publication No. H9-29636

SUMMARY OF INVENTION

Technical Problem

Incidentally, the machining liquid circulating as described above foams in various situations such as when the pressure of the supply pump is high, when passing through the filter, when a circulation flow path is narrow, and when returning from a position above a liquid surface of the machining liquid tank to the machining liquid tank. The bubbles generated in this way accumulate on the liquid surface of the machining liquid stored in the machining liquid tank. If an amount of such bubbles accumulated increases over time, the bubbles are likely to overflow from the machining liquid tank. For this reason, in the related art, taking measures such as reducing an amount of the machining liquid stored in the machining liquid tank in advance under the assumption of the accumulation of bubbles is required.

The present disclosure was made in view of the above problems, and an object of the present disclosure is to make it possible to prevent the accumulation of bubbles in a tank configured to store a liquid.

Solution to Problem

The present disclosure has adopted the following constitution as means for achieving the above object.

A first aspect according to the present disclosure is a defoaming apparatus including: a base unit; a motor supported by the base unit; and a brush connected to the motor and extending below the base unit with a tip directing downward.

In a second aspect according to the present disclosure, in the first aspect, the brush may include: a shaft part in which a base portion is on the motor side; and a plurality of bristle materials protruding from the shaft part in a radial direction of the shaft part.

In a third aspect according to the present disclosure, in the second aspect, a length dimension of the bristle materials disposed in a central region located between a tip portion-side region and a base portion-side region may be shorter than a length dimension of the bristle materials disposed in the tip portion-side region of the shaft part and a length dimension of the bristle materials disposed in the base portion-side region of the shaft part.

In a fourth aspect according to the present disclosure, in the second or third aspect, a plurality of bristle materials may be spirally arranged such that the plurality of bristle materials center on the shaft part.

In a fifth aspect according to the present disclosure, in the fourth aspect, the plurality of bristle materials may be spirally arranged such that the plurality of bristle materials cause bubbles are wound in a direction configured that the bubbles are moved downward by rotating the brush.

In a sixth aspect according to the present disclosure, in the aspect of any one of the first to fifth aspects, the base unit may include: an upper base to which the motor is fixed; a lower base disposed below the upper base; and a separation distance adjusting unit connected to the upper base and the lower base and configured to adjust a separation distance between the upper base and the lower base.

In a seventh aspect according to the present disclosure, in the aspect of any one of the first to sixth aspects, the defoaming apparatus may include: a motor control unit configured to change the number of revolutions of the motor.

Effects of Invention

According to the present disclosure, when a brush is put in a layer in which bubbles have accumulated and is rotated using a motor in this state, it is possible to break bubbles to remove the bubbles or make the bubbles finer. For this reason, according to the present disclosure, it is possible to prevent the accumulation of bubbles in a tank configured to store a liquid.

DESCRIPTION OF EMBODIMENTS

An embodiment of a defoaming apparatus according to the present invention will be described below with reference to the drawings.

Figure 1:
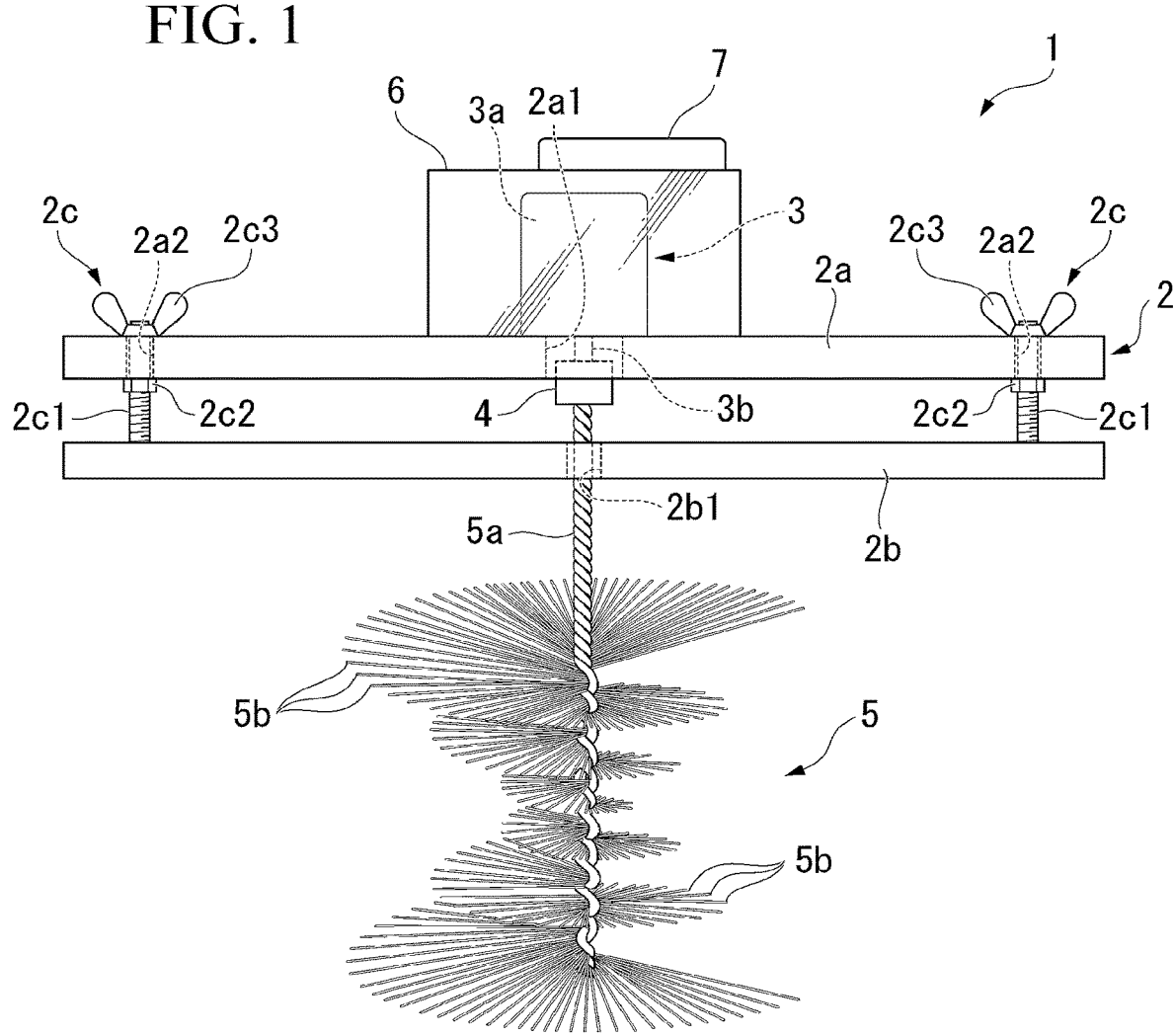
FIG. 1 is a schematic side view showing a schematic constitution of a defoaming apparatus according to an embodiment of the present disclosure.

FIG. 1 is a schematic side view showing a schematic constitution of a defoaming apparatus 1 in the embodiment. The defoaming apparatus 1 in the embodiment prevents an increase in bubbles accumulated on a liquid surface of a machining liquid stored in a machining liquid tank T (refer to FIG. 3A and FIG. 3B) and includes a base unit 2, a motor 3, a coupling 4, a brush 5, a housing case 6, and a motor controller 7 (i.e., motor control unit), as shown in FIG. 1.

The base unit 2 directly or indirectly supports the motor 3, the coupling 4, the brush 5, the housing case 6, and the motor controller 7 and includes an upper panel 2a (i.e., upper base), a lower panel 2b (i.e., lower base), and an elevating mechanism 2c (i.e., separation distance adjusting unit).

The upper panel 2a is a plate-shaped support base that directly supports the motor 3 from below. The upper panel 2a is provided with a through hole 2a1 that passes through a central portion thereof upward/downward (in an upward/downward direction). A shaft 3b which will be described later of the motor 3 and the coupling 4 are disposed in the through hole 2a1. Furthermore, insertion holes 2a2 through which stud bolts 2c1 which will be described later of the elevating mechanism 2c pass are provided at four corners of the upper panel 2a. These insertion holes 2a2 are provided to pass through the upper panel 2a in the upward/downward direction.

The lower panel 2b is a plate-shaped support base that is disposed below the upper panel 2a and is disposed to face the upper panel 2a in a state of being separated therefrom in the upward/downward direction. For example, the lower panel 2b is placed on a lid part of the machining liquid tank T (refer to FIG. 3A and FIG. 3B) and supports the upper panel 2a and the like via the elevating mechanism 2c. The lower panel 2b includes a through hole 2b1 passing through the central portion thereof upward/downward (in the upward/downward direction). The through hole 2b1 is disposed so that the through hole 2b1 and the through hole 2a1 of the upper panel 2a overlap when viewed from above. A shaft part 5a which will be described later of the brush 5 is inserted into the through hole 2b1 in the upward/downward direction. Furthermore, tip portions (i.e., lower end portions) of the stud bolts 2c1 of the elevating mechanism 2c are fixed to four corners of the lower panel 2b. That is to say, the lower panel 2b is connected to the tip portions of the stud bolts 2c1.

The elevating mechanism 2c includes the stud bolts 2c1, countersunk nuts 2c2, and wing nuts 2c3. In the embodiment, the elevating mechanism 2c includes the four stud bolts 2c1. Furthermore, one of the countersunk nuts 2c2 and one of the wing nuts 2c3 are provided for each of the stud bolts 2c1. That is to say, in the embodiment, the elevating mechanism 2c includes four units each of which includes the stud bolt 2c1, the countersunk nut 2c2, and the wing nut 2c3.

Each of the stud bolts 2c1 extends upward from the lower panel 2b so that an axial center is in a vertical direction with a lower end fixed to the lower panel 2b as described above. Each of the stud bolts 2c1 is inserted into each of the insertion holes 2a2 of the upper panel 2a so that the tip thereof is located above the upper panel 2a. The countersunk nuts 2c2 are rotatably screwed to the stud bolts 2c1 and are disposed below the upper panel 2a as shown in FIG. 1. The wing nuts 2c3 are rotatably screwed to the stud bolts 2c1 and are disposed above the upper panel 2a as shown in FIG. 1. These countersunk nuts 2c2 and wing nuts 2c3 are moved in a direction along the axial centers of the stud bolts 2c1 (that is, in the upward/downward direction) by rotating the countersunk nuts 2c2 and the wing nuts 2c3 with respect to the stud bolts 2c1. When the upper panel 2a is disposed between such countersunk nuts 2c2 and wing nuts 2c3 in the upward/downward direction, the position of the upper panel 2a with respect to the stud bolts 2c1 is fixed and a separation distance between the upper panel 2a and the lower panel 2b in the upward/downward direction is also fixed.

When the position of the countersunk nuts 2c2 and the wing nuts 2c3 with respect to the stud bolts 2c1 is moved, an elevating mechanism 2c can change the separation distance between the upper panel 2a and the lower panel 2b. That is to say, in the embodiment, the elevating mechanism 2c is connected to the upper panel 2a and the lower panel 2b and it is possible to adjust the separation distance between these upper panel 2a and lower panel 2b.

The motor 3 includes a motor main body part 3a having a stator core and a rotary core (which are not shown) and the shaft 3b for outputting rotational power generated using the motor main body part 3a to the outside. The motor 3 generates and outputs rotational power by supplying electric power from an external power source. Such a motor 3 is fixed to the upper panel 2a in a state in which the motor main body part 3a is placed on an upper surface of the upper panel 2a. Furthermore, the motor 3 is fixed to the upper panel 2a in a posture in which the shaft 3b protrudes downward from the motor main body part 3a.

The coupling 4 is fixed to the tip (i.e., lower end) of the shaft 3b and connects the shaft 3b and the brush 5. The coupling 4 is disposed with a certain gap in the upward/downward direction with respect to the motor main body part 3a. For this reason, it is possible to prevent the coupling 4 from sliding with respect to the motor main body part 3a and increasing the rotational resistance when the shaft 3b is rotated.

Figure 2:
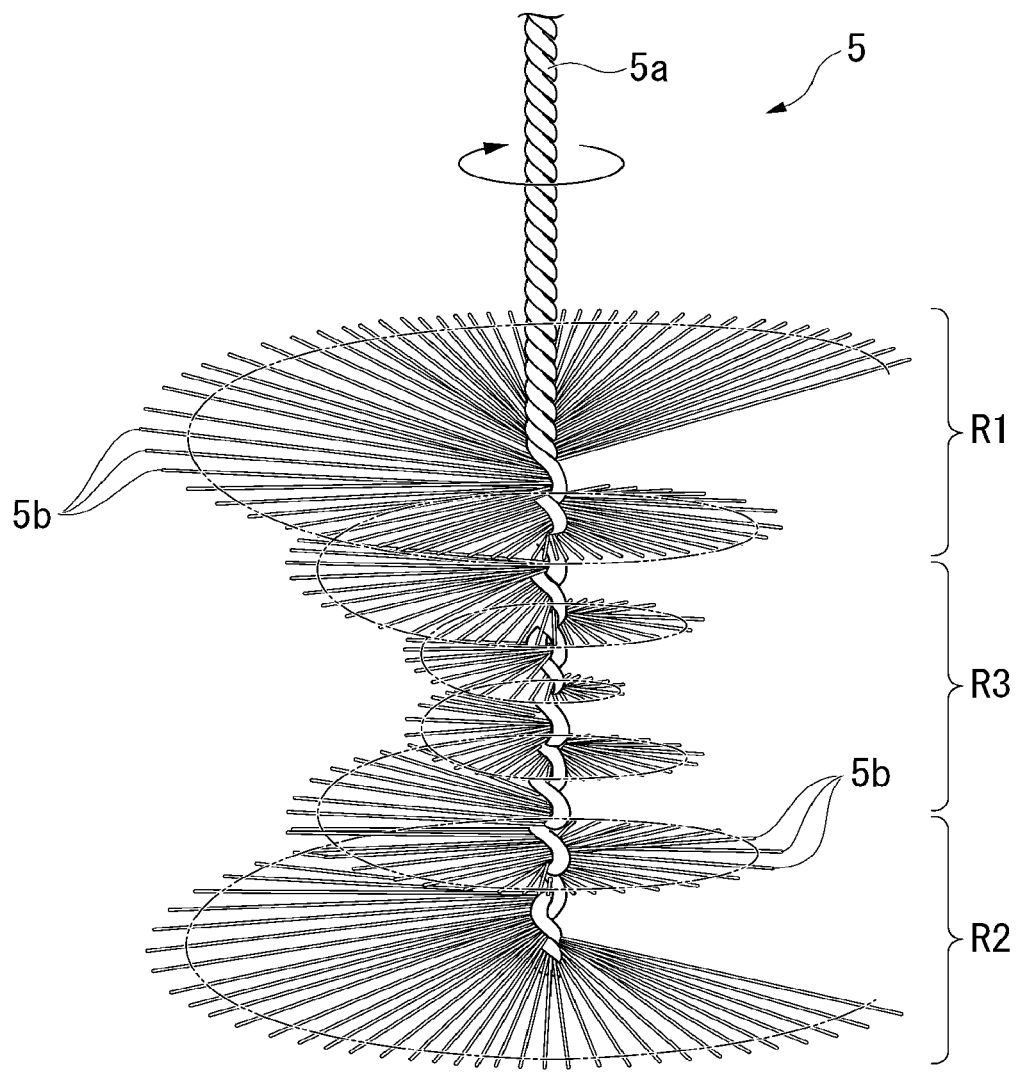
FIG. 2 is an enlarged diagram of a brush included in the defoaming apparatus according to the embodiment of the present disclosure.

As shown in FIG. 1, the brush 5 is connected to the motor 3 and extends below the base unit 2 with the tip directing downward. That is to say, the tip of the brush 5 is located below the base unit 2. FIG. 2 is an enlarged diagram of the brush 5. As shown in the drawing, the brush 5 includes the shaft part 5a and a plurality of bristle materials 5b.

The shaft part 5a is a rod-shaped member whose axial center is disposed in the vertical direction. An uppermost base portion of the shaft part 5a is connected to the shaft 3b of the motor 3 via the coupling 4. That is to say, the base portion of the shaft part 5a is fixed to the coupling 4 in a state in which the tip portion thereof is directed downward. Each of the bristle materials 5b protrudes from the shaft part 5a in a radial direction (i.e., horizontal direction) of the shaft part 5a. These bristle materials 5b are made of a linear wire material having flexibility formed of a metal or the like. Furthermore, as shown in FIG. 1, the bristle materials 5b are provided over a range of a certain height position in which the bristle materials 5b do not reach the lower panel 2b from the tip portion of the shaft part 5a. In such a brush 5, when the shaft 3b of the motor 3 is rotated, the bristle materials 5b are moved about the shaft part 5a in a circumferential direction of the shaft part 5a.

Also, as shown in FIG. 2, within the range in which the bristle materials 5b of the shaft part 5a are provided, the uppermost region is defined as a base portion-side region R1, the lowermost region is defined as a tip portion-side region R2, and a region disposed between the base portion-side region R1 and the tip portion-side region R2 in the upward/downward direction is defined as a central region R3. In this case, a length dimension of the bristle materials 5b disposed in the central region R3 is shorter than a length dimension of the bristle materials 5b disposed in the tip portion-side region R2 and a length dimension of the bristle materials 5b disposed in the base portion-side region R1.

That is to say, in the embodiment, the length dimension of the bristle materials 5b disposed in the central region is shorter than that of the bristle materials 5b disposed in the upper and lower regions in an axial center direction of the shaft part 5a.

Furthermore, as shown by the virtual line in FIG. 2, the plurality of bristle materials 5b are spirally arranged about the shaft part 5a. In the embodiment, as indicated by the arrow in FIG. 2, the brush 5 is rotated clockwise about the shaft part 5a when viewed in a plan view. Furthermore, the plurality of bristle materials 5b are arranged to move the bubbles coming into contact with the bristle materials 5b downward by rotating the brush 5 clockwise as described above. That is to say, the plurality of bristle materials 5b are spirally arranged such that the bristle materials 5b are wound in a direction configured to move bubbles downward by rotating the brush 5. To be more specific, in the embodiment, the plurality of bristle materials 5b are disposed to be provided on the tip (i.e., lower end) side of the shaft part 5a as the bristle materials 5b travel about the shaft part 5a counterclockwise in a circumferential direction when viewed in a plan view. Therefore, the bristle materials 5b are formed in a spiral shape. That is to say, the plurality of bristle materials 5b arranged in a spiral shape are provided in the shaft part 5a so that the bristle materials 5b approach the tip (lower end) of the shaft part 5a as the bristle materials 5b travel counterclockwise when viewed in a plan view in the circumferential direction centering on the shaft part 5a. When the brush 5 is rotated counterclockwise, the plurality of bristle materials 5b may be spirally arranged to correspond to the counterclockwise rotation.

FIG. 2 shows a state in which the bristle materials 5b are arranged spirally one by one. However, the present invention is not limited to such a structure. The spiral arrangement of the bristle materials 5b includes, for example, a case in which a bundle of the bristle materials 5b is spirally arranged.

Referring to FIG. 1 again, the housing case 6 is fixed to the upper surface of the upper panel 2a and includes the motor 3 housed therein. The housing case 6 protects the motor 3 housed therein. The motor controller 7 is fixed to the housing case 6 and is electrically connected to the motor 3. The motor controller 7 includes, for example, an inverter and a drive circuit that drives the inverter and can change the number of revolutions of the motor 3.

Figure 3A:
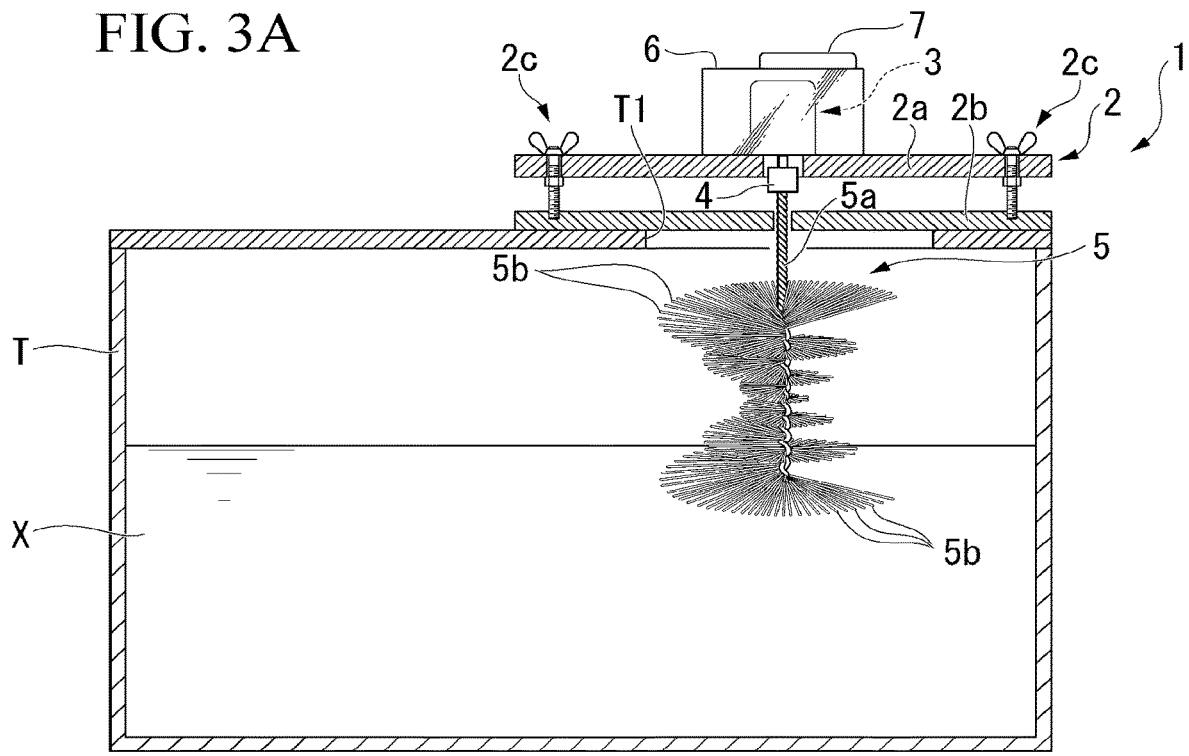
FIG. 3A is a schematic diagram showing a state in which the defoaming apparatus according to the embodiment of the present disclosure is installed in a machining liquid tank and shows a state before an operation of the defoaming apparatus.
Figure 3B:
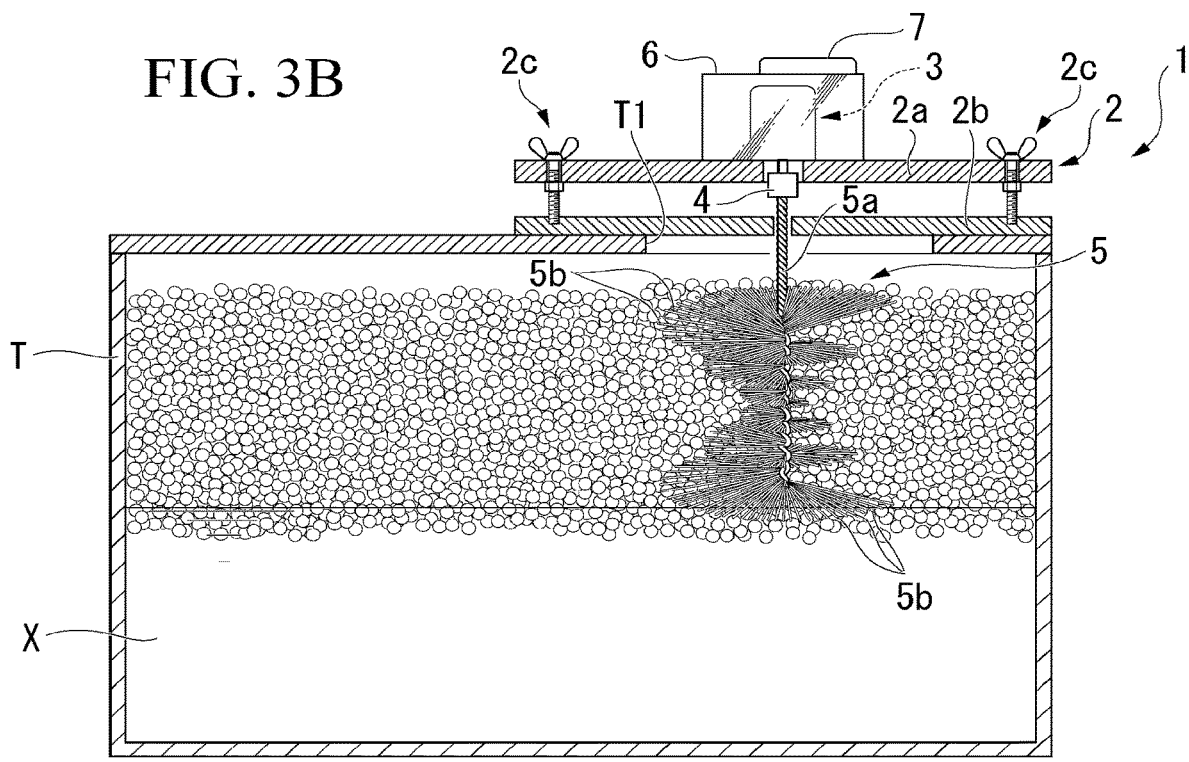
FIG. 3B is a schematic diagram showing a state in which the defoaming apparatus according to the embodiment of the present disclosure is installed in the machining liquid tank and shows a state in which the defoaming apparatus is in operation.

FIGS. 3A and 3B are schematic diagrams showing a state in which the defoaming apparatus 1 in the embodiment is installed in the machining liquid tank T, FIG. 3A shows a state before an operation (before the operation of the defoaming apparatus 1), and FIG. 3B shows a state during the operation (during the operation of the defoaming apparatus 1). When the defoaming apparatus 1 in the embodiment is used to prevent the accumulation of bubbles inside the machining liquid tank T, as shown in FIG. 3A, first, the lower panel 2b of the base unit 2 is placed on a lid of the machining liquid tank T provided with an opening T1 is provided. Here, the defoaming apparatus 1 in the embodiment is placed on the lid of the machining liquid tank T such that the brush 5 is inserted into the machining liquid tank T through the opening T1.

Subsequently, a height position of the brush 5 is adjusted. When the brush 5 is moved upward, the wing nuts 2c3 of the base unit 2 are rotated to be away from the countersunk nuts 2c2 that are counterparts of the wing nuts 2c3. That is to say, the wing nuts 2c3 are rotated with respect to the stud bolts 2c1 such that the wing nuts 2c3 are moved upward. After that, the countersunk nuts 2c2 are rotated with respect to the stud bolts 2c1 such that the countersunk nuts 2c2 are moved upward. Thus, the upper panel 2a supported by the countersunk nuts 2c2 from below is moved upward and the motor 3 and the brush 5 supported by the upper panel 2a are moved upward. Finally, the upper panel 2a is fixed by rotating the wing nuts 2c3 to be close to the countersunk nuts 2c2 and causing the upper panel 2a to be sandwiched between the wing nuts 2c3 and the countersunk nuts 2c2.

Also, when the brush 5 is moved downward, the countersunk nuts 2c2 are rotated with respect to the stud bolts 2c1 such that the countersunk nuts 2c2 of the base unit 2 are moved downward. Thus, the upper panel 2a supported by the countersunk nuts 2c2 from below is moved downward and the motor 3 and the brush 5 supported by the upper panel 2a are moved downward. Finally, the upper panel 2a is fixed by rotating the wing nuts 2c3 to be close to the countersunk nuts 2c2 and causing the upper panel 2a to be sandwiched between the wing nuts 2c3 and the countersunk nuts 2c2.

As shown in FIG. 3A, in the embodiment, the height position of the brush 5 is adjusted so that the tip portion of the brush 5 is immersed in a machining liquid X. To be more specific, if the supply of the machining liquid X to a processing position is started, as shown in FIG. 3B, since the liquid surface of the machining liquid X inside the machining liquid tank T is lowered, the height position of the brush 5 is adjusted so that a tip position of the brush 5 is located slightly above the lowered liquid level.

If the supply of the machining liquid X to the processing position is started, as shown in FIG. 3B, the liquid surface of the machining liquid X is lowered and bubbles are accumulated on the liquid surface of the machining liquid X due to the circulation of the machining liquid X. Here, the brush 5 is rotated by operating the defoaming apparatus 1 in the embodiment. If the brush 5 is rotated in this way, the bristle materials 5b of the brush 5 are rotated in a circumferential direction about the shaft part 5a and the bubbles coming into contact with the bristle materials 5b are broken. As a result, the bubbles are removed or become finer and an increase in amount of bubbles accumulated on the liquid surface of the machining liquid X is reduced.

The defoaming apparatus 1 in the embodiment as described above includes the base unit 2, the motor 3 supported by the base unit 2, and the brush 5 connected to the motor 3 and extending below the base unit 2 with the tip directing downward. According to the defoaming apparatus 1 in the embodiment as described above, when the brush 5 is put into the bubble accumulation layer and the brush 5 is rotated using the motor 3 in this state, the bubbles can be broken to be removed or become finer. For this reason, according to the defoaming apparatus 1 in the embodiment, it is possible to reduce the accumulation of bubbles in the machining liquid tank T which stores the machining liquid X.

Also, when the brush 5 is rotated, bubbles around the brush 5 are wound in accordance with the rotation of the brush 5 and a vortex centering on the brush 5 when viewed from above is formed on a surface layer of the machining liquid X. For this reason, the bubbles are drawn into a center of the vortex, that is, the brush 5, and many bubbles can be effectively broken.

Furthermore, a defoaming agent may be contained in the machining liquid X in some cases. Generally, the defoaming effect of the defoaming agent is enhanced by forming a flow in the machining liquid X. In the defoaming apparatus 1 in the embodiment, since a vortex is formed on the surface layer of the machining liquid X as described above, it is possible to enhance the defoaming effect of the defoaming agent. In the defoaming apparatus 1 in the embodiment, as described above, when the bubbles are rotated around the brush 5, the machining liquid X can flow. For this reason, it is possible to form a flow in the machining liquid X without directly immersing the brush 5 in the machining liquid X. Therefore, the defoaming effect of the defoaming agent can be enhanced while preventing the brush 5 from stirring the machining liquid X and preventing new bubbles from generating.

In the defoaming apparatus 1 in the embodiment, the brush 5 includes the shaft part 5a in which a base portion is on the motor 3 side and the plurality of bristle materials 5b protruding from the shaft part 5a in the radial direction of the shaft part 5a. According to the defoaming apparatus 1 in the embodiment as described above, it is possible to break bubbles using the brush 5 having a simple structure.

In the defoaming apparatus 1 in the embodiment, the length dimension of the bristle materials 5b disposed in the central region R3 located between the tip portion-side region R2 and the base portion-side region R1 is shorter than the length dimension of the bristle materials 5b disposed in the tip portion-side region R2 of the shaft part 5a and the length dimension of the bristle materials 5b disposed in the base portion-side region R1 of the shaft part 5a. For this reason, in the central region R3, bubbles can be taken to the vicinity of the center (i.e., the shaft part 5a) of the brush 5, and the taken bubbles can be broken using the long bristle materials 5b disposed in the tip portion-side region R2 and the base portion-side region R1 from both sides in the upward/downward direction without letting the taken bubbles escape. Therefore, according to the defoaming apparatus 1 in the embodiment, it is possible to more effectively prevent an amount of bubbles accumulated from increasing.

In the defoaming apparatus 1 in the embodiment, the plurality of bristle materials 5b are spirally arranged such that the plurality of bristle materials 5b center on the shaft part 5a. For this reason, the bristle materials 5b can be dispersedly disposed in the axial center direction of the shaft part 5a, and it becomes easier to take the surrounding bubbles closer to the center of the brush 5.

In the defoaming apparatus 1 in the embodiment, the plurality of bristle materials 5b are spirally arranged such that the plurality of bristle materials 5b are wound in a direction configured that bubbles are moved downward by rotating the brush 5. For this reason, when the brush 5 rotates, a downward force acts on the bubbles, and it becomes possible to more reliably prevent the bubbles from overflowing from the machining liquid tank T.

In the defoaming apparatus 1 in the embodiment, the base unit 2 includes the upper panel 2a to which the motor 3 is fixed, the lower panel 2b disposed below the upper panel 2a, and the elevating mechanism 2c connected to the upper panel 2a and the lower panel 2b and configured to adjust the separation distance between the upper panel 2a and the lower panel 2b. For this reason, according to the embodiment, the height position of the brush 5 can be easily changed in accordance with the liquid surface of the machining liquid X.

Also, the defoaming apparatus 1 in the embodiment includes the motor controller 7 configured to change the number of revolutions of the motor 3. A state of bubbles generated changes in accordance with many parameters such as a temperature and a circulation flow rate of the machining liquid X. For this reason, the optimum number of revolutions of the brush 5 to reduce the accumulation of bubbles varies depending on a site in which the machining liquid tank T is installed. Meanwhile, according to the defoaming apparatus 1 in the embodiment, the motor controller 7 can change the number of revolutions of the motor 3 and change the number of revolutions of the brush 5. Thus, according to the defoaming apparatus 1 in the embodiment, it is possible to adjust the number of revolutions of the brush 5 to an optimum value to reduce the accumulation of bubbles.

Although the preferred embodiments of the present disclosure have been described above with reference to the accompanying drawings, it goes without saying that the present disclosure is not limited to the embodiment described above. The various shapes and combinations of the constituent members shown in the embodiments described above are examples and can be variously changed on the basis of design requirements and the like without departing from the spirit of the present disclosure.

For example, in the embodiment described above, a constitution in which the defoaming apparatus in the present disclosure prevents the accumulation of bubbles inside the machining liquid tank T has been described. However, the present disclosure is not limited thereto. The present disclosure can be used as a defoaming apparatus for preventing bubbles from accumulating on a liquid surface in a tank which stores a liquid different from the machining liquid X.

Also, in the embodiment described above, a constitution in which the brush 5 has the shaft part 5a and the plurality of bristle materials 5b extending in the radial direction from the shaft part 5a has been described. However, the present disclosure is not limited thereto. For example, it is also possible to use brushes of different shapes such as brushes with a bristle material provided on a plate-shaped base.

Furthermore, in the embodiment described above, a constitution in which only one brush 5 is provided has been described. However, the present disclosure is not limited thereto. In addition, it is also possible to adopt a constitution in which a plurality of brushes 5 are provided.

In the embodiment described above, a constitution in which the base unit 2 can adjust the height position of the brush 5 has been described. However, the present disclosure is not limited thereto. It is also possible to adopt a constitution in which the height position of the brush 5 is fixed. In such a case, for example, it is also possible to constitute the base unit 2 using only the upper panel 2a.

INDUSTRIAL APPLICABILITY

According to the present disclosure, when a brush is put in a bubble accumulation layer and is rotated using a motor in this state, it is possible to break bubbles to remove the bubbles or make the bubbles finer. For this reason, according to the present disclosure, it is possible to prevent the accumulation of bubbles in a tank configured to store a liquid.

REFERENCE SIGNS LIST

1 Defoaming apparatus
2 Base unit
2a Upper panel (i.e., upper base)
2a1 Through hole
2a2 Insertion hole
2b Lower panel (i.e., lower base)
2b1 Through hole
2c Elevating mechanism (i.e., separation distance adjusting unit)
2c1 Stud bolt
2c2 Countersunk nut
2c3 Wing nut 3 Motor
3a Motor main body part
3b Shaft
4 Coupling
5 Brush
5a Shaft part
5b Bristle material
6 Housing case
7 Motor controller (i.e., motor control unit)
R1 Base portion-side region
R2 Tip portion-side region
R3 Central region
T Machining liquid tank
T1 Opening
X Machining liquid

The invention claimed is:

1. A defoaming apparatus comprising:
a base unit;
a motor supported by the base unit; and
a brush connected to the motor, wherein
the brush includes:
   a shaft part extending a vertical direction, the shaft part including a base portion and a tip portion, the base portion being closer to the motor than the tip portion; and
   a plurality of bristle materials protruding from the shaft part in a radial direction of the shaft part,
the brush extends below the base unit with the tip portion directing downward,
the plurality of bristle materials are spirally arranged such that the plurality of bristle materials center on the shaft part,
the plurality of bristle materials includes:
   first bristle materials disposed at the tip portion of the shaft part;
   second bristle materials disposed at the base portion of the shaft part; and
   third bristle materials positioned between the first bristle materials and the second bristle materials, and disposed at a center of the shaft part, and
a length dimension of the third bristle materials is shorter than a length dimension of the first bristle materials and a length dimension of the second bristle materials.

2. The defoaming apparatus according to claim 1,
wherein the plurality of bristle materials are spirally arranged such that the plurality of bristle materials are wound in a direction configured that bubbles are moved downward by rotating the brush.

3. The defoaming apparatus according to claim 1,
wherein the base unit includes:
   an upper base to which the motor is fixed;
   a lower base disposed below the upper base; and
   a separation distance adjusting unit connected to the upper base and the lower base and configured to adjust a separation distance between the upper base and the lower base.

4. The defoaming apparatus according to claim 1, further comprising:
a motor control unit configured to change a number of revolutions of the motor.

* * * * *